United States Patent [19]

Blasius et al.

[11] Patent Number: 4,460,474

[45] Date of Patent: Jul. 17, 1984

[54] PROCESS FOR THE EXTRACTION OF CESIUM IONS FROM AQUEOUS SOLUTIONS USING AN ADDUCT COMPOUND IN SOLID FORM COMPRISING A MACROCYCLICAL POLYETHER AND AN INORGANIC HETEROPOLY ACID

[75] Inventors: Ewald Blasius, Saarbrücken; Karl-Heinz Nilles, St. Ingbert, both of Fed. Rep. of Germany

[73] Assignee: Kernforschungszentrum Karlsruhe GmbH, Karlsruhe, Fed. Rep. of Germany

[21] Appl. No.: 412,800

[22] Filed: Aug. 27, 1982

[30] Foreign Application Priority Data

Aug. 31, 1981 [EP] European Pat. Off. ......... 81106782.6

[51] Int. Cl.$^3$ ............................................. B01J 39/04
[52] U.S. Cl. .................................... 210/679; 210/681; 423/181
[58] Field of Search ............... 210/638, 679, 681, 682; 423/181

[56] References Cited

U.S. PATENT DOCUMENTS

| | | | |
|---|---|---|---|
| 2,925,323 | 2/1960 | Rimshaw | 423/181 |
| 3,097,920 | 7/1963 | Knoll | 423/181 |
| 4,033,764 | 7/1977 | Colegate et al. | 210/679 |
| 4,087,375 | 5/1978 | Tanno | 210/682 |

FOREIGN PATENT DOCUMENTS

| | | |
|---|---|---|
| 149403 | 7/1973 | Czechoslovakia . |
| 149404 | 7/1973 | Czechoslovakia . |
| 165751 | 11/1976 | Czechoslovakia . |

OTHER PUBLICATIONS

J. Rais et al., "New Type of Sorbents Based on Polyethers and Some Hydrophobic Anions", J. of Radioanalytical Chem. vol. 35, (1977), pp. 351–359.

L. A. Fernando et al., "Alkali Metal Ion Specificity of a Crown Ether Precipitate with Phosphomolybdic Acid", Radiochem. Radioanal. Letters 38/5–6/3-87–394/1979, pp. 387–394.

L. A. Fernando et al., "Ion-Exchange Properties of Crown Ether-Phosphomolybdic Acid Precipitates", Anal. Chem., 1980, vol. 52, pp. 1115–1119.

Journal of the American Chemical Society, vol. 89, Nov. 8th, 1967, No. 23, pp. 7017–7036.

*Primary Examiner*—Ivars C. Cintins
*Attorney, Agent, or Firm*—Sughrue, Mion, Zinn, Macpeak and Seas

[57] ABSTRACT

A process for the extraction of cesium ions from an aqueous solution with an adduct compound in solid form containing a macrocyclical polyether and an inorganic heteropoly acid. The adduct compounds employed comprise an adduct of (a) benzo-15-crown-5 (B-15-C-5); dibenzo-21-crown-7 (DB-21-C-7); or dibenzo-30-crown-10 (DB-30-C-10), with (b) 12-molybdophosphoric acid (HPMo); 12-tungstophosphoric acid (HPW); 12-molybdosilicic acid (HSiMo); 12-tungstosilicic acid (HSiW); or an Na, K, Tl, or NH$_4$ salt of any of these acids.

19 Claims, No Drawings

PROCESS FOR THE EXTRACTION OF CESIUM IONS FROM AQUEOUS SOLUTIONS USING AN ADDUCT COMPOUND IN SOLID FORM COMPRISING A MACROCYCLICAL POLYETHER AND AN INORGANIC HETEROPOLY ACID

BACKGROUND OF THE INVENTION

The present invention relates to a process for the extraction of cesium ions from aqueous solutions using an adduct compound in solid form comprising a macrocyclical polyether (crown ether) and an inorganic heteropoly acid which is stable in a strongly acid and oxidizing medium.

The processing and solidification of medium active aqueous wastes (MAW), developed during the reprocessing of irradiated nuclear fuels and/or nuclear breeder materials, e.g., in the form of waste solutions, waste concentrates or waste sludges, is rendered more difficult by the presence of small quantities of the cesium isotopes $Cs^{134}$ and $Cs^{137}$. During the vitrification of MAW, cesium evaporates to a noticeable degree and is also easily leached out of the solidified products intended for permanent storage, such as glass blocks, cement blocks and bitumen blocks. Selective extraction of the Cs would considerably simplify the treatment of medium active wastes. Furthermore, if $Sr^{90}$ were simultaneously extracted from the MAW, low radioactive aqueous wastes (LAW=low active waste) would be obtained since, after a relatively short decay period, practically the entire activity of MAW originates from the relatively long-lived radionuclides $Cs^{137}$ ($t_{\frac{1}{2}}=30$ yrs) and $Sr^{90}$ ($t_{\frac{1}{2}}=26$ yrs).

According to prior-art processes, the extraction of Cs and Sr was achieved mainly by means of coprecipitation reactions. The coprecipitation reactions, however, did not result in satisfactory DF (decontamination factor) values for Sr and Cs. Therefore, different processes have been investigated which would make possible a selective extraction of the two radionuclides, either jointly or individually.

The extraction processes for $Cs^+$ ions developed thus far, however, are not suited for the extraction of $Cs^+$ from a typical MAW with a high concentration of $NaNO_3$ and free nitric acid. The composition of such a typical MAW is shown in the following Table 1:

TABLE 1

| Components (strongly acidic MAW) | Concentration g/dm$^3$ | |
|---|---|---|
| Nitric acid | 64 | (1 mol/dm$^3$) |
| Sodium nitrate | 42.5 | (0.5 mol/dm$^3$) |
| Uranium | 1.0 | |
| Lead | 0.8 | |
| Calcium | 0.2 | |
| Magnesium | 0.2 | |
| Iron | 0.15 | |
| Ruthenium | 0.07 | |
| Potassium | 0.05 | |
| Zinc | 0.05 | |
| Copper | 0.04 | |
| Manganese | 0.02 | |
| Chromium | 0.02 | |
| Nickel | 0.01 | |
| Zirconium | 0.005 | |
| Cesium | 0.004 | |
| Cerium | 0.004 | |
| Strontium | 0.002 | |
| Antimony | 0.002 | |
| Niobium | 0.001 | |

The extraction processes for $Cs^+$ ions that have been developed use mostly organic reagents which are added either to the organic phase or to the aqueous phase to be extracted. These reagents, however, would be destroyed either hydrolytically or by oxidation, or would be made ineffective by protonization if they came into contact with the MAW whose essential components are such as those described in Table 1 above.

$Cs^+$ selective heteropoly acids are known which are very stable in the highly acid environment provided by an MAW having a composition such as described in Table 1. The $Cs^+$ selective heteropoly acids are used as extraction agents in the form of an organic phase with nitrobenzene as a solvent. For example, 12-molybdophosphoric acid (HPMo) is a $Cs^+$ selective heteropoly acid which can be dissolved in nitrobenzene. In this form, the heteropoly acids are equally unsuitable for the continuous $Cs^+$ extraction from an MAW of the type described in the above Table 1, since they bleed considerably from the nitrobenzene into the aqueous phase due to their good water solubility. They would have to be replaced continuously.

If HPMo is used, the molybdenum would enter into the MAW in large quantities and would furthermore interfere with the subsequent processing of the MAW, such as during vitrification. Finally, depending on the $Cs^+$ concentration of the MAW and the heteropoly acid concentration in the nitrobenzene phase, there is the danger of precipitate formation which could lead to considerable disruptions in a continuously operating system.

In contrast to the above prior-art water soluble extraction agent for $Cs^+$, dibenzo crown ethers have a very low water solubility and are thus, at least in part, suitable for use in a continuous extraction process.

Since crown ethers are neutral ligands, the anion in the aqueous solution being treated is also extracted during the extraction. This, however, significantly influences the extraction coefficient. In this way, simple cesium salts, such as chloride and nitrate salts, are very difficult to extract with the use of crown ethers in polar solvents, with the exception of nitromethane solutions and nitrobenzene solutions. For this reason, the prior art started to combine crown ethers with known $Cs^+$ specific reagents which contain voluminous, polarizable anions. Up to now, this has been done by adding the $Cs^+$ specific reagents, in most cases picric acid, to the aqueous phase to be extracted, and extracting with the aid of crown ethers, in most cases dibenzo-18-crown-6 (DB-18-C-6) or dicyclo-hexyl-18-C-6, in polar solvents, in most cases nitrobenzene.

For the extraction of $Cs^+$ from nuclide containing solutions, J. Rais and P. Selucky proposed two extraction systems which use DB-18-C-6. In one method, as described in Czechoslovakian Patent No. 149403, DB-18-C-6 was employed in an organic phase and dipicrylamine was added to the aqueous phase to be extracted. In a second method, as described in Czechoslovakian Patent No.149404, DB-18-C-6 was employed in an organic phase and sodium tetraphenylborate was added to the aqueous phase to be extracted.

These processes, however, are limited to alkaline $Cs^+$ solutions having a pH of 11 to 13 inasmuch as dipicrylamine is protonized in the acid range, and sodium tetraphenylborate is hydrolyzed in the acid range. Moreover, both processes only function well in the absence of large quantities of $Na^+$ and $K^+$.

Furthermore, the same authors, as disclosed in Czechoslovakian Patent No. 165751, have produced an adduct of DB-18-C-6 with 12-molybdophosphoric acid which permits a column chromatographic extraction of the Cs+ from waste solutions. Large quantities of Na+ and K+, however, also present a problem here. The adduct of DB-18-C-6 with 12-molybdophosphoric acid was prepared by a two phase reaction in which an organic phase comprising a solution of the crown ether in dichloromethane was shaken with an aqueous phase comprising a solution of HPMo in 2 mol/1 $HNO_3$. This patent also refers generally to adducts with 12-tungstophosphoric acid (HPW). A similar disclosure of an adduct of DB-18-C-6 with molybdophosphoric acid appears in *J. Radioanal. Chem.* Vol. 35 (1977), pages 351 to 359.

Adducts of DB-18-C-6 with 12-molybdophosphoric acid or 12-tungstophosphoric acid produced according to the methods of Czechoslovakian Patent No. 165751 or *J. Radioanal. Chem.* Vol. 35 (1977) 351+, respectively, were tested in a series of experiments using the MAW described in the above Table 1. The adduct of DB-18-C-6 with 12-molybdophosphoric acid had a $K_d$ value of 5 cm$^3$/g, and the adduct of DB-18-C-6 with 12-tungstophosphoric acid had a $K_d$ value of 9 cm$^3$/g.

The distribution coefficient $K_d$ of a metal ion between a solid phase and a liquid phase is given by the following:

$$K_d = \frac{\text{total concentration of metal ion per g of dry solid phase (solid exchanger after equilibration)}}{\text{total concentration of metal ion per cm}^3 \text{ of liquid phase (solution remaining after equilibration)}}$$

In practice, the $K_d$ value is determined by comparing the concentrations (in the present case, the concentrations were determined by measuring the count rate in 5 ml solution) before and after the series of experiments, and accordingly the following formula can be applied for the calculation of the $K_d$ value:

$$K_d = \frac{\text{count (aqueous) before equilibration} - \text{count (aqueous) after equilibration}}{\text{count (aqueous) after equilibration}} \cdot BF, \text{ where}$$

$$BF = \text{Batchfactor} = \frac{\text{volume of the aqueous phase (cm}^3\text{)}}{\text{exchanger quantity (g)}}$$

On the other hand, a $K_d$ value of about 100,000 cm$^3$/g was obtained by using only the inorganic component of the above 12-molybdophosphoric acid DB-18-C-6 adduct in its $NH_4^+$ form, namely, 12-ammonium molybdophosphate, hereafter referred to as AMP, in the MAW of Table 1. Similarly, a $K_d$ value of about 350,000 cm$^3$/g was obtained by using only the inorganic component of the 12-tungstophosphoric acid/DB-18-C-6 adduct in its $NH_4^+$ form, namely, 12-ammonium tungstophosphate, hereafter AWP, in the MAW of Table 1.

AMP and AWP are not well suited for the column chromatographic separation of Cs+ from the above-mentioned MAW of Table 1, since they bleed when applied to asbestos as well as to silica gel or organic polymers as carrier material.

In *Radiochem. Radioanal. Letters*, Vol. 38 (1979), pages 387 to 394, Fernando et al report on the use of a DB-18-C-6/HPMo precipitate to absorb K+, Na+ and Rb+ from aqueous $HNO_3$. In *Anal. Chem.* Vol. 52 (1980), pages 1115-1119, Fernando et al report on the use of precipitates formed from HPMo with crown ethers of 15-crown-5, benzo-15-crown-5, DB-18-C-6, and DB-24-C-8. Fernando et al state that such precipitates, in most cases, have a molar ratio of crown ether/HMPo of 3/1 even though the initial ratio used to form the precipitate was much less. Fernando et al disclose molar ratios ranging from 2.9:1 to 4.3:1 for the precipitates they prepared.

Experiments with a precipitate of benzo-15-crown-5 with HPMo as the sorbent indicated the following results (quotation from Fernando et al, Anal. Chem., Vol. 52, (1980), page 1118, left column, second paragraph below table V):

"Although the benzo-15-crown-5 sorbent was equilibrated with Li+, Na+, K+, Rb+, Cs+ and Ca$^{2+}$ solutions, it did not sorb any of these cations to a detectable extent. This is an unexpected result, as in liquid phase complexation, the benzo-15-crown-5 ether does indeed behave in a manner similar to the 15-crown-5 ether (22)."

SUMMARY OF THE PRESENT INVENTION

It is an object of the present invention to provide an improved process for the extraction of cesium ions from an aqueous solution of the above-mentioned type.

A further object of the present invention is to provide such a process which can be carried out successfully and trouble free, in discontinuous as well as continuous operation, even in the presence of large quantities of sodium and potassium ions, and without being limited to certain pH ranges.

Another object of the present invention is to provide such a process which is well suited for ion exchange chromatography and possess a high degree of effectiveness.

To achieve the foregoing objects and in accordance with its purpose, the present invention provides a process for extracting cesium ions from an aqueous solution with an adduct compound in solid form, the adduct compound being an adduct of a crown ether with an inorganic heteropoly acid component which is stable in a strong acid and oxidizing medium, comprising employing an adduct compound of: (a) a crown ether selected from benzo-15-crown-5 (B-15-C-5); dibenzo-21-crown-7 (DB-21-C-7); and dibenzo-30-crown-10 (DB-30-C-10); with (b) an inorganic heteropoly acid selected from 12-molybdophosphoric acid (HPMo); 12-tungstophosphoric acid (HPW); 12-molybdosilicic acid (HSiMO); 12-tungstosilicic acid (HSiW); or an Na, K, Tl or $NH_4$ salt of the heteropoly acid.

In an advantageous embodiment of the present invention, the adduct compound is present in the form of a solid ion exchanger phase incorporated in a suitable porous carrier, such as porous silica gel or in porous aluminum oxide.

For carrying out the process according to the present invention, the aqueous solution containing the cesium ions is brought into contact with the solid adduct compound, or with the solid ion exchanger phase of the silica gel or the $Al_2O_3$, to load the solid phase with cesium ions, and the resulting aqueous solution which is now free of cesium or contains only small amounts of cesium, is separated from the loaded solid phase.

In an especially advantageous embodiment of the process according to the present invention, the solid adduct compound has a molar ratio of crown ether to heteropoly acid, or heteropoly acid salt, in the range between $\geq 0.5:1$ and $\leq 2.0:1$. As used throughout the specification and claims, when molar ratios of crown ether to heteropoly acid component are given, the moles of inorganic heteropoly acid component are based on the moles of phosphorus or silica, respectively, in these components.

Molar ratios of crown ether to heteropoly acid component in the range between $\geq 0.5:1$ and $\leq 2.0:1$ can be obtained by one of the following two techniques.

In the first technique, the individual components of the adduct are dissolved in a molar ratio range of crown ether to heteropoly acid or $N_2$ salt between $\geq 0.5:1$ and $\leq 2.0:1$ in acetone alone, or in a suspension of silica gel or $Al_2O_3$ in acetone. The acetone is then removed. The acetone can be removed by extracting the acetone, as by vacuum drying, and evaporating any remaining acetone residue.

After removing the acetone the H+-form can be transferred into the M(I)+-forms, where M(I)+ is K+, Tl+ or $NH_4^+$.

In the second technique, a prefabricated solid crown ether/heteropoly acid or salt adduct having a $\geq 3:1$ molar ratio is dissolved in acetone alone, or in a suspension of silica gel or $Al_2O_3$ in acetone. A heteropoly acid or salt is then added until a total molar ratio crown ether to hteropoly acid or salt between $\geq 0.5:1$ and $\leq 2.0:1$ is obtained in the solution or suspension, respectively. The acetone solvent is then removed, as by extraction in a vacuum dryer and evaporating any remaining acetone residue.

Any of the other production methods, be it a two phase reaction, such as disclosed in Czechoslovakian Patent No. 165751 and *J. Radioanl. Chem.* Vol. 35 (1977), page 351, or by precipitation from a homogeneous solution such as a dioxane/water solution, always results in a ($\geq 3:1$) adduct. Only with the above methods of the present invention area adducts possible which have, within limits, any desired crown ether: heteropoly acid ratios. For example, (3:1) adducts produced by a two phase reaction or from a homogeneous solution can later be converted to (1:1) adducts by the described second technique.

It is to be understood that both the foregoing general description and the following detailed description are exemplary, but are not restrictive of the invention.

DETAILED DESCRIPTION OF THE PRESENT INVENTION

The solid adduct compounds employed in the present invention are the product of (a) a crown ether selected from benzo-15-crown-5 (B-15-C-5), dibenzo-21-crown-7 (DB-21-C-7), and dibenzo-30-crown-10 (DB-30-C-10), with (b) a heteropoly acid component which is a heteropoly acid or a heteropoly acid salt. The heteropoly acid is selected from 12-molybdophosphoric acid (HPMo), 12-tungstophosphoric acid (HPW), 12-molybdosilicic acid (HSiMo) and 12-tungstosilicic acid (HSiW). The heteropoly acid salt is an Na, K, Tl or $NH_4$ salt of any of these heteropoly acids, and is referred to as an M(I) loaded form, where M(I) is Na, K, Tl, or $NH_4$.

The solid adduct compounds suitable for the process according to the present invention have, among other advantages, the advantages that they can be stored in stable form, are easy to dose, can be used directly in the desired M(I) loaded form, and are easy to manage.

The adduct compounds can be used as powder, as well as in the form of a solid ion exchanger phase incorporated in porous silica gel or in porous aluminum oxide. In the process according to the present invention, the adduct compounds are employed as a stationary phase which is brought into contact with the aqueous solution containing cesium ions for the purpose of extracting the cesium from the aqueous solution, whereby the stationary phase is loaded with the cesium ions. Very high $K_d$ values are obtained for the cesium.

The adduct compounds of the present invention generally are prepared from a homogeneous phase. An attempt was made to isolate the heteropoly acid adduct DB-21-C-7/HPMo by following the general procedure disclosed in *J. Radioanal. Chem.* Vol. 35 (1977) 351 and Czechoslovakian Patent No. 165751 (1976). These publications, as discussed previously, disclose a process for producing an adduct by shaking a crown ether solution, specifically DB-18-C-6, in dichloromethane with a solution of HPMo or HPW, respectively, in 2 mol/l $HNO_3$. When this procedure was applied to DB-21-C-7/HPMo, the process resulted only in a sticky, viscous dark brown mass, as compared to the microcrystalline product obtained through conversion using DB-18-C-6. The yield of DB-21-C-7/HPMo after further processing of the viscous product was only 50%.

By following techniques which are within the scope of the present invention, however, the adduct DB-21-C-7/HPMo can be quantitatively isolated if the production takes place in a homogeneous phase.

The production of the adducts in solid form will now be illustrated by the following techniques 1a, 1b, 1c, 2 and 3. In these techniques, the following chemicals were used: $H_3[PMo_{12}O_{40}].xH_2O$ with $x\approx29$; $H_3[PW_{12}O_{40}].xH_2O$ with $x\approx24$ by Merck; and DB-21-C-7, produced according to an improved technique based on the work of C. J. Pedersen. in *J. Am. Chem. Soc.* Vol. 89 (1967) page 7017 et seq.

Technique 1a

This technique illustrates the production of the 3:1 adduct (DB-21-C-7/HPMo [3:1]).

A first solution is produced by dissolving 0.5 g DB-21-C-7 (0.00124 mol) in 40 cm³ acetone. A second solution is produced by dissolving 0.97 g (HPMo.29 $H_2O$ in 20 cm³ acetone. An exact molar ratio of 3:1 must be accurately maintained. Both solutions are united, and the acetone solvent is extracted in a vacuum, during which process the temperature may reach up to 50° C. In this manner a brownish green loose product is obtained (1.25 g).

Technique 1b

This technique illustrates the production of the 4:1 adduct (DB-21-C-7/HPMo [4:1]).

The procedure employed in Technique 1b is the same as that employed in Technique 1a, except that 0.67 g DB-21-C-7 (0.00165 mol) are used instead of 0.5 g. A yellow-brown product of still lower bulk density is obtained.

The 3:1 adducts and 4:1 adducts obtained according to Techniques 1a and 1b, respectively, can easily be pulverized in a mortar into products of higher bulk density.

The above-mentioned production Techniques 1a and 1b can also take place in the presence of silica gel, resulting in phases which are suitable for ion exchanger chromatography and which, in contrast to extraction chromatography (liquid-liquid-distribution chromatography), are solid and free of solvents.

The 1:1 adducts (H+-form) can analogously be produced according the procedures 1a and 1b taking 0.5 g DB-21-C-7 and 2.9 g HPMo.29 H$_2$O under the said conditions, and the M(I)-forms analogue the procedure 1c in absence of silicagel, using concentrated M(I)NO$_3$ solutions.

The $\geq$2:1 adducts are suitable for removing Cs from aqueous acid solutions (down to pH=0) containing low concentrations of Na+ and K+ ions. Adducts of other crown ethers ($\geq$2:1) are suitable only in weak acid solutions with low acid concentrations of Na+ and K+ ions.

Technique 1c

This technique illustrates the production of DB-21-C-7/NH$_4$PW [1:1] adduct on silica gel 100 in a weight ratio of adduct to silica gel of 1:1.

A quantity of 0.5 g DB-21-C-7 and 4.1 g HPW.24H$_2$O are dissolved in a reaction vessel in 10 to 15 cm$^3$ acetone while being lightly heated. A quantity of 4.2 g of silica gel 100 which has been purified with concentrated HCl, of a grain size of 63 to 200 microns (Merck) is added to the vessel. The vessel is covered with a paper towel and the acetone solvent is extracted in a vacuum shelf dryer at 50° C. to produce a solid exchanger. Subsequently, the exchanger is converted to the ammonium form by treating it with 3 mol/l NH$_4$NO$_3$ solution. The weight ratio of silica gel to the pure 1:1 adduct is 1:1. The Cs+ capacity at a pH of 7 is 0.29 mmol Cs+/g of dry exchanger, which corresponds to 2/3 of the theoretical capacity.

If the DB-21-C-7/heteropoly acid adducts are intended for use in column chromatographic processes, with or without silica gel as carrier, the more stable 3:1 adduct cannot be used for the extraction of Cs+ from strong acid MAW solutions. If used in solid form (solid exchangers), these adducts show, in contrast to the 3:1adducts dissolved in nitrobenzene (liquid exchangers), a low degree of extraction capacity in strongly acid solutions containing high amounts of Na+, so that K$_d$ values of only up to 40 can be obtained for the MAW mentioned in Table 1. The 2:1 adducts also furnish K$_d$ values of only up to 150 cm$^3$/g.

If the molar ratio DB-21-C-7:heteropoly acid is lowered to 1:1, however, the K$_d$ value jumps to values around 50,000 cm$^3$/g.

Of the 1:1 adducts, however, only the Te+, K+ and NH$_4$+ forms have sufficient stability. If treated continuously with the mentioned MAW of Table 1, the H+ form gradually converts to the more stable 3:1 adduct by giving off the excess heteropoly acid.

The H+-form and the Na+-form are suitable only in one- or two-sorption-step distributions.

Technique 2

This technique illustrates the production of the $\geq$3:1 DB-21-C-7/HPMo adduct by means of a precipitation reaction. In this technique, while stirring, a solution of 0.5 g DB-21-C-7 in 20 cm$^3$ dioxane is caused to flow into a solution of 1.3 g HPMo.29H$_2$O in 200 cm$^3$ 0.5 mol/l HNO$_3$ during which process a voluminous precipitate is deposited. This precipitate is separated by means of a Büchner funnel. The separated precipitate is then washed first with 0.5 mol/l HNO$_3$ and subsequently with H$_2$O. The washed precipitate is then dried in a vacuum at 50° C.

Technique 3

This technique illustrates the production of loaded forms of the heteropoly acid adducts. In the present invention, the loaded forms of the heteropoly acid adducts can, for the first time, be directly isolated as microcrystalline products. The Na+, K+, NH$_4$+ and Tl+ forms can be produced by the following general procedure, demonstrated on the example of HPMo to obtain a $\geq$3:1 adduct:

A solution of 1.0 g HPMo.29H$_2$O in 10 cm$^3$ H$_2$O is poured into a solution of 0.5 g DB-21-C-7 in 20 ml dioxane, whereby, after a brief period of stirring, a clear solution is obtained. Under stirring, 5 cm$^3$ of the corresponding cold saturated M(I) nitrate solution, where M(I) represents Na+, K+, NH$_4$+ or Tl+, is added within 1 minute, during which process a yellow voluminous precipitate is precipitated. After stirring for another ½ hour, the precipitate is subsequently filtered by suction by means of a Büchner filter, is washed first with 50 cm$^3$ of the corresponding 0.5 mol/l M(I) nitrate solution, and subsequently with 20 cm$^3$ H$_2$O. The K+, NH$_4$+ and Tl+ forms are dried at 110° C., the Na+ form at 90° C. A yellow to ocher-yellow powder is obtained whose quantitative yield is approximately 1.3 g.

All remaining DB-21-C-7/heteropoly acid adducts, that is, adducts with other heteropoly acids, as well as adducts having different crown ethers, can be produced according to Techniques 1a to c, 2 and 3. The solid adducts produced, for example, according to Techniques 1a, 2 and 3 can be converted to lower molar ratios of crown ether to heteropoly acid component by dissolving in acetone, then adding heteropoly acid or salt, and thereafter removing the acetone.

The solid adducts of the present invention can be employed in ion exchanger chromatography directly as such, or as column material applied to silica gel or Al$_2$O$_3$.

The following examples are given by way of illustration to further explain the principles of the invention. These examples are merely illustrative and are not to be understood as limiting the scope and underlying principles of the invention in any way. All percentages referred to herein are by weight and all ratios for the components of the adduct are mol ratios, unless otherwise indicated.

EXAMPLE 1

This example illustrates the use of a solid DB-21-C-7/NH$_4$PW (1:1) adduct (produced according Technique 1b) in a series of experiments.

For 1 hour at a time, a quantity of 0.05 g of DB-21-C-7/NH$_4$PW (1:1) powder was repeatedly brought into contact in discontinuous operation each time with 10 cm$^3$ of the MAW set forth in the above Table 1. This operation is best conducted in a sealable centrifuge tube, so that after centrifuging the syphoning off the remaining (excess) solution, the experiment can be continued in the same vessel.

At first the K$_d$ value for Cs+ climbed from 35,000 cm$^3$/g to an equilibrium value of up to 190,000 cm$^3$/g and by the tenth distribution step declined to a value around 20,000 cm$^3$/g.

A comparison series of experiments was conducted in which tertiary AWP was employed instead of the DB-21-C-7/NH$_4$PW adduct. When the tertiary AWP was employed, K$_d$ dropped from an initial 350,000 cm$^3$/g to 6,000 cm³/g at the 6th distribution step, and to 1,200 cm³/g after the 10th distribution step.

EXAMPLE 2

This example illustrates that the use of solid DB-21-C-7/NH₄PMo (1:1) (produced according to Technique 1b) in a series of experiments.

The procedure of Example 1 was repeated, except that 0.05 g DB-21-C-7/NH₄PMo (1:1) powder was brought in contact with the MAW in a discontinuous series of experiments. At first, the $K_d$ value for Cs+ climed from 53,000 cm³/g up to an equilibrium value of 150,000 cm³/g, and then fell to 16,000 cm³/g after the 10th distribution step.

A comparison series of experiments was conducted in which tertiary AMP was employed instead of DB-21-C-7/NH₄PMo. $K_d$ declined from an initial value of 30,000 cm³/g to 500 cm³/g at the 3rd distribution step.

EXAMPLE 3

This example illustrates the use of DB-21-C-7-NH₄PW (1:1) on silica gel (produced according Technique 1c).

The procedure of Example 1 was repeated, except that a quantity of 0.1 g of the solid adduct DB-21-C-7/NH₄PW (1:1) on purified silica gel 100 of a grain size of 63 to 200 microns (Merck) was used. The solid phase was free of solvents. The $K_d$ value dropped from an initial value of 17,000 cm³/g to 5,000 cm³/g at the 6th distribution step.

EXAMPLE 4

This example illustrates the use of B-15-C-5/NH₄PW [1:1] in a discontinuous series of experiments.

The production of the adduct took place analogously to the production of the corresponding DB-21-C-7 adduct employed in Example 1. In order to accelerate establishment of equilibrium with the MAW, the adduct was pretreated in the following manner:

A quantity of 3 g B-15-C-5/NH₄PW [1:1] powder was stirred at room temperature for 3 hours in a 50 ml of a solution containing 1 mol/l HNO₃ and 0.5 mol/l NaNO₃. The powder then was filtered by means of a Büchner funnel, washed with 0.5 mol/l HNO₃ and some H₂O, and dried at 50° C.

First, 0.1 g of the thus pretreated adduct was shaken for 1 hour with 10 ml of a solution of 20 ppm Cs in 1 mol/l HNO₃. This corresponds to 5 times the Cs+ quantity contained in the MAW. A $K_d$ value of 330,000 cm³/g was obtained.

Subsequently, the adduct was shaken, as described in Example 1 in a discontinuous series of experiments, each time with 10 ml of the simulated MAW set forth in Table 1 (4 ppm Cs) and for 1 hour. After 5 distributions, the $K_d$ value was 39,000 cm³/g.

EXAMPLE 5

This example illustrates the use of DB-21-C-7/NH₄PW [1:1] (produced according Technique 1b) in a discontinuous series of experiments.

For one hour at a time, a quantity of 0.1 g DB-21-C-7/NH₄PW [1:1] powder was repeatedly discontinuously shaken with 10 ml of a simulated MAW whose composition is stated in Table 2 below.

The $K_d$ value climbed from an initial value of 7800 cm³/g to 30,000 cm³/g at the 4th distribution step.

TABLE 2

| Component | Concentration (g/dm³) |
|---|---|
| HNO₃ | 50.4 (0.8 mol/l) |
| NaNO₃ | 289 (3.4 mol/l) |
| Uranium | 1.9 |
| Calcium | 1.6 |
| Magnesium | 0.8 |
| Iron | 0.4 |
| Molybdenum | 0.4 |
| Aluminum | 0.24 |
| Copper | 0.16 |
| Zinc | 0.16 |
| Chromium | 0.08 |
| Potassium | 0.08 |
| Manganese | 0.08 |
| Nickel | 0.08 |
| Zirconium | 0.08 |
| Ruthenium | 0.006 |
| Cesium | 0.004 |
| Strontium | 0.001 |

It will be understood that the above description of the present invention is susceptible to various modifications, changes and adaptions, and the same are intended to be comprehended within the meaning and range of equivalents of the appended claims.

What is claimed is:

1. Process for the extraction of cesium ions from an aqueous solution with an adduct compound in solid form containing a crown ether and an inorganic heteropoly acid component which is stable in strong acid and oxidizing medium, comprising: employing as the adduct compound an adduct of (a) a crown ether selected from benzo-15-crown-5; dibenzo-21-crown-7; and dibenzo-30-crown-10; with (b) a heteropoly acid selected from 12-molybdophosphoric acid; 12-tungstophosphoric acid; 12-molybdosilicic acid; and 12-tundgsosilicic acid; or an Na, K, Tl, or NH₄ salt of the heteropoly acid, with the adduct of benzo-15-crown-5 with component (b) having a molar ratio of crown ether to heteropoly acid or heteropoly acid salt of less than or equal to 2:1.

2. Process as defined in claim 1, wherein the adduct compound is present in the form of a solid ion exchanger phase incorporated in a porous carrier.

3. Process as defined in claim 2 wherein the carrier is porous aluminum oxide.

4. Process as defined in claim 2 wherein the carrier is porous silica gel.

5. Process as defined in claim 2, 3 or 4, wherein the aqueous solution containing the cesium ions is brought into contact with the solid ion exchanger phase to load the solid phase with cesium ions, and the loaded solid phase is separated from the aqueous solution.

6. Process as defined in claim 1, wherein the aqueous solution containing cesium ions is brought in contact with the solid adduct compound, to load the solid with cesium ions, and the loaded solid is separated from the aqueous solution.

7. Process as defined in claim 1, wherein the solid adduct compound has a molar ratio of crown ether to heteropoly acid, or heteropoly acid salt, in the range between $\geq 0.5:1$ and $\leq 2:1$.

8. Process as defined in claim 7, wherein the solid adduct compound has been obtained by
  (a) dissolving the crown ether and heteropoly acid or salt in a molar ratio range of crown ether to heteropoly acid or salt between $\geq 0.5:1$ and $\leq 2.0:1$ in acetone, and
  (b) then removing the acetone.

9. Process as defined in claim 8, wherein the acetone is removed by extracting the acetone and evaporating any acetone residue.

10. Process as defined in claim 8 or 9 wherein the crown ether and acid are dissolved in acetone alone.

11. Process as defined in claim 8 or 9 wherein the crown ether and acid are dissolved in a suspension of silica gel in acetone.

12. Process as defined in claim 8 or 9 where the crown ether and acid are dissolved in a suspension of $Al_2O_3$ in acetone.

13. Process as defined in claim 8, wherein the crown ether/heteropolyacid salt adduct has been obtained after removing the acetone, as in step (b), by contacting the $H^+$ adduct with a K, Tl or $NH_4$ salt solution.

14. Process as defined in claim 7, wherein the solid adduct compound has been obtained by
  (a) dissolving in acetone a preproduced solid crown ether/heteropoly acid or heteropoly acid salt adduct having a $\geqq 3:1$ molar ratio of crown ether to heteropoly acid or salt,
  (b) adding heteropoly acid or heteropoly acid salt until a molar ratio of crown ether to heteropoly acid or salt between $\geqq 0.5:1$ and $\leqq 2.0:1$ is reached, and
  (c) then removing the acetone.

15. Process as defined in claim 14, wherein the acetone is removed by extracting the acetone and evaporating any acetone residue.

16. Process as defined in claim 14 or 15, wherein the adduct is dissolved in acetone alone.

17. Process as defined in claim 14 or 15, wherein the adduct is dissolved in a suspension of silica gel in acetone.

18. Process as defined in claim 14 or 15, wherein the adduct is dissolved in a suspension of $Al_2O_3$ in acetone.

19. Process as defined in claim 7, wherein the molar ratio of crown ether to heteropoly acid or heteropoly acid salt is 1:1.

* * * * *